(12) United States Patent
Karakaya

(10) Patent No.: US 10,827,893 B2
(45) Date of Patent: Nov. 10, 2020

(54) DUST PROCESSING

(71) Applicant: KONINKLIJKE PHILIPS N.V., Eindhoven (NL)

(72) Inventor: Koray Karakaya, Eindhoven (NL)

(73) Assignee: KONINKLIJKE PHILIPS N.V., Eindhoven (NL)

( * ) Notice: Subject to any disclaimer, the term of this patent is extended or adjusted under 35 U.S.C. 154(b) by 0 days.

(21) Appl. No.: 15/566,409

(22) PCT Filed: Mar. 31, 2016

(86) PCT No.: PCT/EP2016/056990
§ 371 (c)(1),
(2) Date: Oct. 13, 2017

(87) PCT Pub. No.: WO2016/165945
PCT Pub. Date: Oct. 20, 2016

(65) Prior Publication Data
US 2018/0296050 A1    Oct. 18, 2018

(30) Foreign Application Priority Data

Apr. 17, 2015 (EP) .................... 15163982

(51) Int. Cl.
| | | |
|---|---|---|
| *G01N 21/00* | (2006.01) | |
| *A47L 9/28* | (2006.01) | |
| *G01N 15/02* | (2006.01) | |
| *G01N 15/06* | (2006.01) | |
| *G01N 15/00* | (2006.01) | |

(52) U.S. Cl.
CPC .......... *A47L 9/281* (2013.01); *G01N 15/0205* (2013.01); *G01N 15/06* (2013.01); *A47L 2201/06* (2013.01); *G01N 2015/0046* (2013.01); *G01N 2015/0693* (2013.01)

(58) Field of Classification Search
None
See application file for complete search history.

(56) References Cited

U.S. PATENT DOCUMENTS

| | | | | |
|---|---|---|---|---|
| 5,815,884 A | * | 10/1998 | Imamura | .................. A47L 9/19 15/339 |
| 2007/0157415 A1 | * | 7/2007 | Lee | ......................... A47L 5/225 15/319 |
| 2009/0119867 A1 | | 5/2009 | Senoo | |
| 2012/0169497 A1 | | 7/2012 | Schnittman | |
| 2014/0197956 A1 | | 7/2014 | Alexander | |

FOREIGN PATENT DOCUMENTS

| | | |
|---|---|---|
| CN | 103412086 A | 11/2013 |
| EP | 0451787 A1 | 10/1991 |
| JP | 2005211565 A | 8/2005 |

(Continued)

*Primary Examiner* — Mikhail Kornakov
*Assistant Examiner* — Ryan L. Coleman

(57) ABSTRACT

A method of dust processing comprises measuring (PC1) a first amount of particles of a first size (e.g. PM10), and measuring (PC2) a second amount of particles of a second size (e.g. PM2.5) smaller than the first size. In accordance with the invention, it is determined (Δ) whether the first amount exceeds the second amount by a predefined threshold. If so, a robotic vacuum cleaner (RVC) may be prompted to start cleaning a room.

20 Claims, 2 Drawing Sheets

(56) References Cited

FOREIGN PATENT DOCUMENTS

| | | |
|---|---|---|
| JP | 2006218005 A | 8/2006 |
| JP | 2007037916 A | 2/2007 |
| JP | 2007135653 A | 6/2007 |
| JP | 3950403 B2 | 8/2007 |
| JP | 2014233353 A | 12/2014 |
| JP | 2014240733 A | 12/2014 |
| WO | 0172100 A1 | 9/2001 |
| WO | 2001072199 A1 | 10/2001 |
| WO | 2011082606 A1 | 7/2011 |

* cited by examiner

DUST PROCESSING

This application is the U.S. National Phase application under 35 U.S.C. § 371 of International Application No. PCT/EP2016/056990, filed on Mar. 31, 2016, which claims the benefit of International Application No. 15163982.0 filed on Apr. 17, 2015. These applications are hereby incorporated by reference herein.

FIELD OF THE INVENTION

The invention relates to a method and device for dust processing, such as dust measurement and/or dust measurement guided cleaning.

BACKGROUND OF THE INVENTION

WO 01/72199 discloses a device for cleaning of rooms. At least one measuring means is connected to a control system and designed for continuously measuring at least the content of particles in the room and for transmitting measurement signals to the control system. The control system comprises storing media for storing a predetermined comfort value, measurement signals from the measuring means and cleaning instructions for cleaning the room. The control system is connected to a display unit for displaying the determined cleaning program.

US 2009/0119867 discloses an electric vacuum cleaner that includes a dust amount sensor for sensing the amounts of dusts of different sizes (for example, dusts having diameters of 0.1 mm and 0.03 mm). The determination controller controls the electric power supply to the electric blower based on the amounts of dusts of the different sizes sensed by the dust amount sensor. For each dust size, an optimum power setting is determined, and then the maximum of these power settings is used.

SUMMARY OF THE INVENTION

It is, inter alia, an object of the invention to provide an improved dust processing. The invention is defined by the independent claims. Advantageous embodiments are defined in the dependent claims.

One aspect of the invention provides a method of dust processing, comprising measuring a first amount of particles of a first size (e.g. PM10), and measuring a second amount of particles of a second size (e.g. PM2.5) smaller than the first size. It is then determined whether the first amount exceeds the second amount by a predefined threshold. If so, a user may be informed about the need to start cleaning, or a robotic vacuum cleaner may be prompted to start cleaning a room.

Another aspect of the invention provides a dust processing device for carrying out the dust processing method according to the invention, the dust processing device comprising: a particle counter for measuring a first amount of particles of a first size, and a second amount of particles of a second size smaller than the first size, and a control circuit for determining whether the first amount exceeds the second amount by a predefined threshold.

Another aspect of the invention provides a dust processing system comprising such a dust processing device, the control circuit having an output for providing a control signal indicating whether the first amount exceeds the second amount by the predefined threshold, and a cleaning apparatus (e.g. a robotic vacuum cleaner and/or an air purifier, or the cleaning parts thereof) having an input for receiving the control signal for starting a cleaning operation in dependence on the control signal. This dust processing system may be integrated as an air purifier or vacuum cleaner, or alternatively, the dust processing device may be separate from the air purifier or vacuum cleaner, or in yet another alternative implementation, the dust processing device may be part of an air purifier while its control signal is (also) used to control a vacuum cleaner.

These and other aspects of the invention will be apparent from and elucidated with reference to the embodiments described hereinafter.

DESCRIPTION OF EMBODIMENTS

Figure 1:
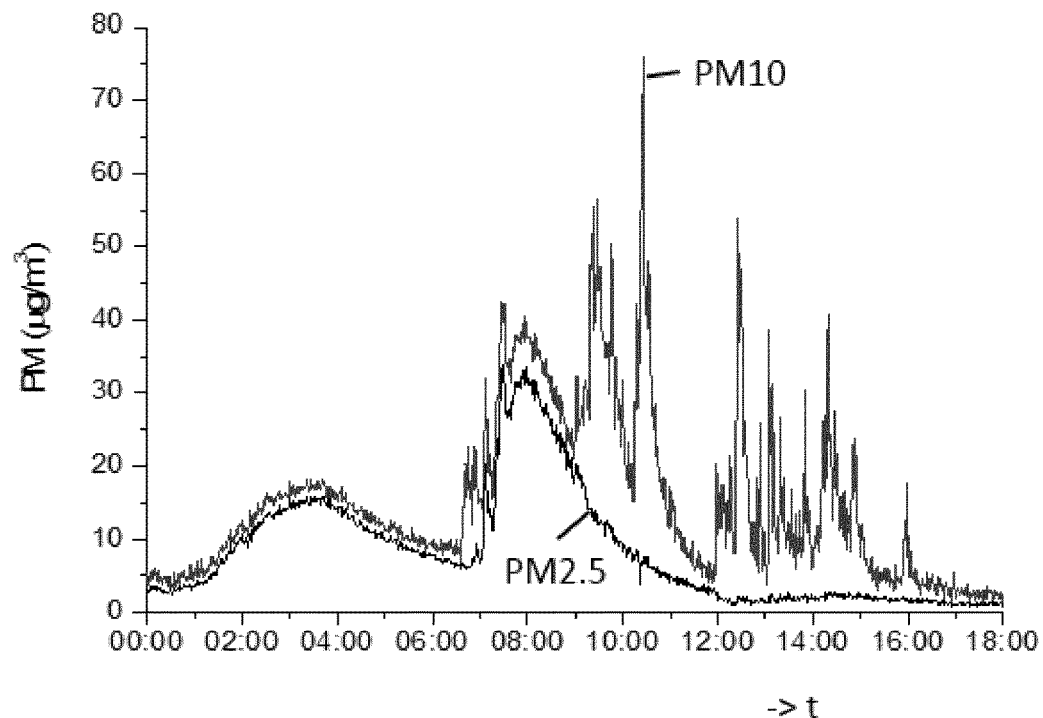
FIG. 1 shows an example of PM2.5 and PM10 behavior in real life conditions.

Airborne particles pose different aerosol and settling characteristics depending on their size. For example, PM1 and PM2.5 (airborne particles smaller than 1 μm and 2.5 μm in diameter, respectively) are aerosols typically have a very long settling down time. PM 2.5 particle sensors are able to detect aerosols like combustion particles, organic compounds, smoke from cigarettes or food that is being baked, etc. PM5 relates to particles up to 5 μm. However, larger particles such as PM10 (larger particles, smaller than 10 μm), due to their larger mass, have a significantly shorter settling time on surfaces. PM10 is associated with large particles like dust, pollen and mold, which form the larger portion of indoor dust and dirt on surfaces. PM200 (covering dirt up to 200 μm) would also cover pet hair. One aspect of the present invention provides a method for assessment of actual indoor dust level for advanced cleaning and hygiene applications, such as vacuum cleaning and dusting.

Household cleaning is a time and energy consuming activity. The time spent for cleaning a complete home is in order of hours, which is a serious amount of time for the fast-pace urban living. This has driven a number of innovations for further automation in home cleaning, such as robotic vacuum cleaners that can perform these routine tasks in an autonomous manner.

Unless limited by visual or non-visual markers (e.g. so called 'lighthouse' type of navigation markers), or by physical obstacles (e.g. doorsteps, doors, etc.), state of the art robotic vacuum cleaners cover the complete floor area. This is a burden for robotic vacuum cleaner design since the vacuum cleaner has to meet the following minimum requirements:

Sufficient energy source=>dictates a large battery capacity.

Sufficient dust collection capacity=>dictates a large volume dust collection chamber.

Sufficient processing power for executing algorithms meant for optimizing the travel route.

These requirements cause an increase in the bill-of-material (BoM), the size of the appliance, as well its overall energy consumption. Considering the ever increasing pressure on minimizing the overall energy expenditure of vacuum cleaning devices, preventing unnecessary cleaning of already clean/not so dirty zones will be helpful of reconsidering the energy requirements.

Vacuum cleaning is typically done on a periodic basis (e.g. weekly), and most of the time for the complete indoors area, e.g. living or office area. However, not all sections of an area are used as frequently as other sections, and this also creates different levels of dust/dirt at different sections. Currently there is a need for accessing this information by means of objective sensing methods that can guide automated devices for cleaning where it is actually needed at.

One aspect of the present invention describes a method for detecting the 'dirty' zones at indoors, which will help solving the aforementioned problems, and will bring the following advantages:

Minimizing the unnecessary cleaning cycles on clean zones.

Building an objective decision criteria for cleaning zone selection, for automated cleaning devices.

By means of minimizing the cleaning area:
  Minimizing the overall energy consumption of the device.
  Hence, minimizing the battery size.
  Minimizing the device dimensions (e.g. height and diameter), and enhancing accessibility.

One embodiment of the invention is based on utilizing the data generated by particle detectors, especially the particle detectors capable of detecting the difference between small and large particle concentration, e.g. PM2.5 and PM10. Suitable particle detectors are commercially available, e.g. from Shinyei.

An example of PM2.5 and PM10 behavior in real life conditions (a living room in a house occupied by 2 adults) is given in FIG. 1, showing particle concentration PM in $\mu g/m^3$ against time t in hours of the day. At about 3 AM there is a background aerosol level increase. At about 8 AM there is a peak caused by breakfast (fried eggs). During the morning and the afternoon there are PM10 peaks caused by regular daily activities. Those PM10 peaks relate to dust and allergen concentrations. The relationship between PM2.5 and PM10 concentration presented in FIG. 1 has two important aspects:

1. PM2.5 and PM10 levels are in good agreement during aerosol generating events (e.g. cooking), or changes in background aerosol concentration (e.g. outdoor air pollution).
2. PM10 peaks are correlated to human activity (e.g. walking), which is a result of air movement that also moves the settled dust from surfaces.

FIG. 1 shows a clear distinction between aerosol generating events and human activity that moves dust. The difference between PM10 and PM2.5 concentration tells us:

Human activity in the room=>presence/usage statistics
The accumulated dust level=>indication of the cleaning need
Dust level over time=>visualizing the consumer benefit PM2.5 is a subset of PM10. In other words, PM10 does not exclude PM2.5, but adds on top of PM2.5 a larger size fraction of particles.

There are a number of cases (especially at indoors) that the PM2.5 level is almost equal to the PM10 level: this is a results of different dominating events that generates only small sized particles i.e. fine dust): for example, in case of cooking, or cigarette smoke, the PM10 and PM2.5 concentrations are almost equal. In FIG. 1, the first two peaks give almost equal values for PM2.5 and PM10. This is a result of the events that generate only fine aerosols, but no coarse particles at all.

While also for pure PM2.5 peaks a cleaning action may be desired, for such fine particles only an air cleaner/purifier would be effective. Vacuum cleaning is designed to be effective on coarse particles only, i.e. dust that has settled on surfaces. That's why the present invention focuses on the difference between the PM10 and PM2.5 levels as a preferred dust level assessment indicator, since that difference stands for coarse dust amount which can be removed by a vacuum cleaning action.

If the PM10 level has decreased in a room, then we know that the room is clean. An increasing PM10-PM2.5 level may be a trigger for cleaning a room. This trigger may cause a user to clean a room by a conventional vacuum cleaner. The trigger may alternatively cause action by a robotic vacuum cleaner to clean the room.

Particle detectors to detect the airborne particles correspond to small (e.g. PM2.5) and large (e.g. PM10) particle levels could be implemented e.g. as follows. A particle sensor (e.g. one based on light scattering) is basically capable of measuring both ranges, with mutually different settings for the sampling time, the sample air flow rate, etc. known to those skilled in the art. Some possible adaptations on the particle sensors for improving size selectivity have been described in Applicant's earlier non-prepublished patent applications EP14190779.0 and EP14191227.9, incorporated herein by reference.

An embodiment of the present invention relies on these two major aspects of aerosol/particle behavior for extracting the following information about the cleanness/dirt level at indoors:

1. Usage statistics about the area/room: the number and the length of the PM10 peaks indicates the human presence in that area/room. Please also note that, for households these peaks may also relate to the activity of pets. However, from the home cleaning point of view, this does not create a difference, since pet hair, pet dandruff and dust/dirt carried along with pets is an equally important aspect of indoor hygiene.
2. Level of settled dust: the difference (delta) between small and large particle concentration level (preferably represented by PM2.5 and PM10 levels, respectively) correlates with the amount of settled dust at indoors. Temporal averaging of this difference indicates the overall cleanliness/dirt level in the room/area.

An embodiment of the invention provides a device comprising:

a particle detector for detecting particles, at least in these two particle size classes, a signal and data acquisition and processing unit that tracks the discrete peaks of large particle concentrations (e.g. PM10), a memory for storing data over time for providing temporal information about the difference between small and large particle levels, an optional control unit for controlling the air velocity in the vicinity of the particle detector for normalizing the large particle concentration peaks with the actual air velocity, and a user interface and/or other cleaning devices for providing the derived cleanliness/dirt level feedback to user.

Various aspects of the invention provide the following embodiments.

1. At least one particle detector: preferably an optical particle detector (i.e. based on light scattering), which is capable of differentiating the particle size classes for small and large particles, that correspond to aerosol and dust, respectively.
2. In an alternative embodiment, a household appliance that consists of a particle detector; e.g. in an air purifier, which transmits the data to its ecosystem about the indoor air pollution levels at different size classes correspond to aerosol and settling dust (e.g. PM2.5 and PM10).
3. In yet another embodiment a stand-alone sensor unit that contains (among others) a particle detector as described in previous two items.
4. An optional means of creating a controlled air movement in the vicinity of the particle sensors, for example by:
   a. an air puff on a surface of interest (e.g. floor), e.g. by a small pump or a fan
   b. by a controlled movement of an element, for example, of the vacuum cleaner (e.g. by rotation of the corner cleaning brush of the vacuum cleaner)
   c. by movement of the robotic cleaner itself, preferably at a known velocity.
   d. by using a dedicated 'dust mapping' device (not necessarily comprises a cleaning function) that moves in the area of interest and collects dust information.
5. In an alternative and/or complementary way to the 4th embodiment; including an air velocity monitoring unit for assessment of the air flow rates caused by the intentional devices (e.g. fans, pumps, or brush), or by unintentional means like human movements or air currents in the room.
6. A signal/data acquisition unit for collecting the information from built in, or a part of another appliance, or stand-alone particle detectors, or from another appliance as described above.
7. A signal/data processing unit for processing the data acquired from the particle detectors for extracting the following information:
   a. The number of large particle peaks=>for indicating the room/area usage frequency.
   b. The difference between the small and large particle levels=>for indicating the cleanliness/dirt level in the room/area.
   c. (with the support of a local or cloud data storage capability) calculating the temporal deviation of the difference between small and large particle levels.
8. The aforementioned signal/data processing and/or an auxiliary computing unit (e.g. mobile device, another appliance, etc.) which is capable of executing decision making processes based on the relationship between aforementioned information in the 4th embodiment.
9. A user interface for giving feedback to the user about the cleanliness/dirt level at a room/area.
10. A means of communication and data transfer between other appliances and stand-alone sensor units and/or external user interfaces, for communicating the cleanliness/dirt level information about the location of interest.
11. An internal or external means of storing and processing the temporal data, for further use by a data/information interface; e.g. time series graphs, cleanliness/dirt level indicators, etc.

Figure 2:
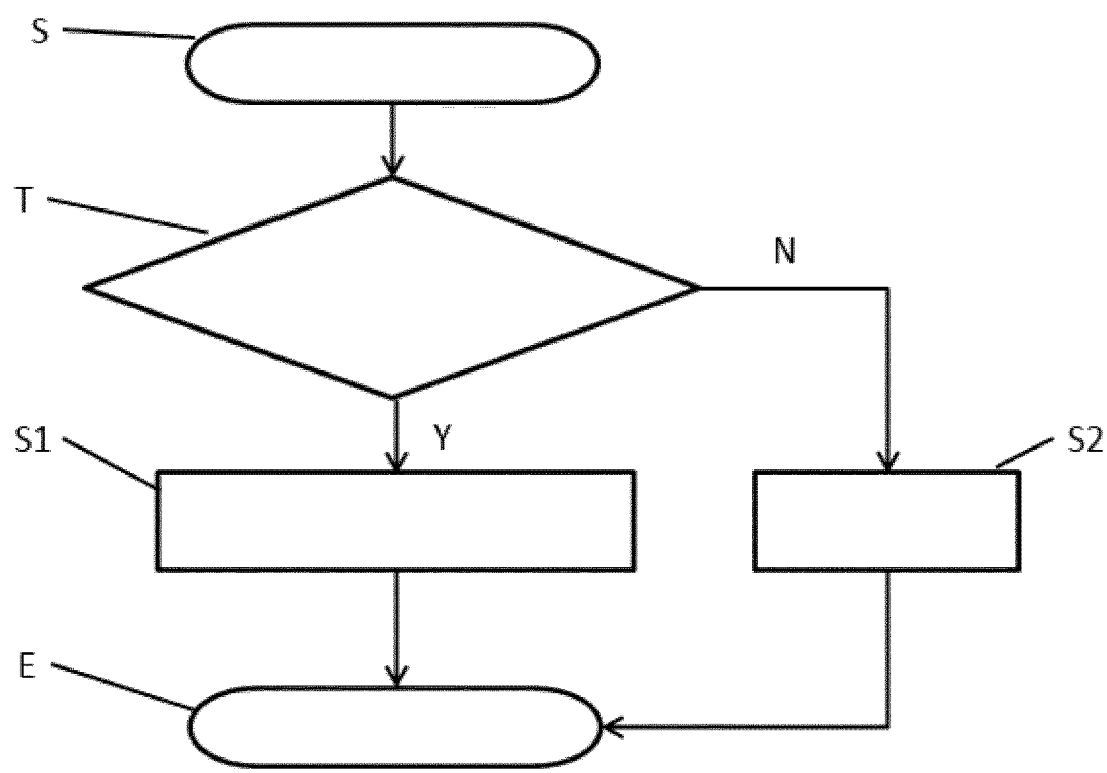
FIG. 2 shows a flow chart of a method in accordance with an embodiment of the invention.

An example of the basic process flow for a simple cleaning decision coupled to a trigger value (TV), which is an indicator of the difference of large and small particle concentration, for example Δ (PM10-PM2.5), is presented in FIG. 2. Indeed, the given process flow can be further expanded for covering up the data from multiple sensors (also form other appliances that contain particle sensors), as well as covering the temporal differences between small and large particles. The process starts at step S, and ends at step E. In test step T it is verified whether the difference between the PM10 and PM2.5 levels exceeds a dirt level limit for that room. If yes (Y), then in step S1, a cleaning cycle is initiated for this room. If no (N), then in step S2, the room is not cleaned.

In a preferred embodiment, the trigger value (TV) or dirt level limit can be selected arbitrarily by the user, depending on the desired cleanness/hygiene level of the area of interest. This also allows setting up different trigger values for different parts of the indoors/household; e.g. a low trigger level for bedroom, and a higher value for the living room, etc. Some examples of the trigger values may be as follows:
   TV<5 µg/m3→high cleanness level, e.g. for bedroom, kitchen area, areas with residents with high airborne allergen sensitivities, etc.,
   5 µg/m3<TV<20 µg/m3→intermediate cleanness level, and
   20 µg/m3<TV<50 µg/m3→low cleanness level, for example areas with heavy use pattern, e.g. living room, entrance, etc.

Figure 3:
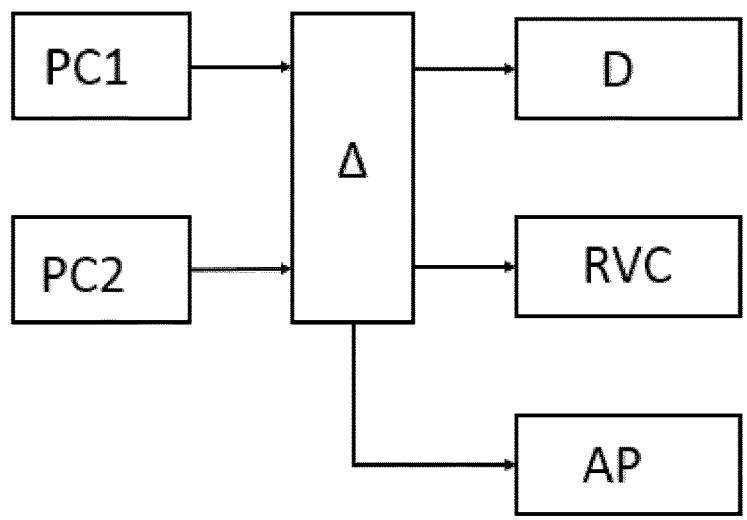
FIG. 3 shows a basic embodiment of a system in accordance of the invention.

FIG. 3 shows a basic embodiment of a system in accordance with the invention, including particle sensors PC1, PC2 for measuring levels of relatively large particles (e.g. PM200, preferably PM10) and relatively small particles (e.g. PM5, preferably PM2.5), respectively, and a control circuit Δ for calculating a difference between these levels. The embodiment may further include a display D for showing the difference between the small and large particle levels, optionally after integration over time. The embodiment may further include a robotic vacuum cleaner RVC that starts cleaning a room if the difference exceeds a threshold. Optionally, a further output of the control circuit Δ is coupled to an air purifier AP that starts working in the presence of PM2.5 levels exceeding a threshold of e.g. 20 µg/m$^3$ if a relatively moderate air quality is desired, or 10 µg/m$^3$ or even 5 µg/m$^3$ if a relatively high air quality is desired. The combination of particle sensors PC1, PC2 and control circuit Δ may be a standalone unit that remotely controls the robotic vacuum cleaner RVC and/or the air purifier AP. This standalone unit may have no display D of its own e.g. if it is able to transmit (e.g. via Bluetooth or WiFi) the difference to a smartphone or tablet so that the smartphone or tablet could display information to a user. It is alternatively possible that the combination of particle sensors and difference calculation circuit is part of the air purifier AP and able to remotely control the robotic vacuum cleaner RVC (e.g. via Bluetooth, RF4CE or WiFi). It is possible to use a single sensor or particle counter for both sizes PM2.5 and PM10 if the respective particle counts are carried out sequentially and the sensor settings are varied in dependence on the particle size to be counted.

The present invention may be used for operating robotic/autonomous cleaning devices, i.e. for activating/operating these devices on the locations where they are actually needed. That would result in a robotic vacuum cleaning system supported by actual dirt level information. In other terms, a cleaning-on-demand type of operation, by incorporating sensors indicating the dirt level at the area. In one embodiment, he sensing system includes at least one particle sensor, operating in the sensor ecosystem of the appliance, which is capable of measuring small and large particles (e.g. PM2.5 and PM10). The sensor ecosystem could include sensors on board of the cleaning device, similar type of sensors on other appliances (e.g. air purifiers), as well as stand-alone sensor units. The invention can alternatively be used in professional cleaning services that operate on pay per clean type of business models, indoor allergen control systems, air purifiers, kitchen appliances with particle detection capabilities, and stand-alone sensor units for monitoring indoor air quality.

It should be noted that the above-mentioned embodiments illustrate rather than limit the invention, and that those skilled in the art will be able to design many alternative embodiments without departing from the scope of the appended claims. In the claims, any reference signs placed between parentheses shall not be construed as limiting the claim. The word "comprising" does not exclude the presence of elements or steps other than those listed in a claim. The word "a" or "an" preceding an element does not exclude the presence of a plurality of such elements. The invention may be implemented by means of hardware comprising several distinct elements, and/or by means of a suitably programmed processor. In the device claim enumerating several means, several of these means may be embodied by one and the same item of hardware. The mere fact that certain measures are recited in mutually different dependent claims does not indicate that a combination of these measures cannot be used to advantage.

The invention claimed is:

1. A method of dust processing, comprising:
    measuring, via a first particle sensor prior to activation of a vacuum cleaner or an air purifier for cleaning, a first amount of particles of up to a first size in an indoor area of interest;
    measuring, via a second particle sensor prior to activation of the vacuum cleaner or the air purifier for cleaning, a second amount of particles of up to a second size, wherein the second size is smaller than the first size; and
    determining, via a control circuit configured to communicate with the first and second particle sensors, whether the first amount exceeds the second amount by a predefined threshold in the indoor area of interest, wherein the predefined threshold is a threshold trigger value selected from a group consisting of different threshold trigger values used to distinguish different concentrations levels of dust and/or dirt at different sections of the indoor area of interest; and
    wherein the control circuit is configured such that when the first amount is determined to exceed the second amount by the predefined threshold, the control circuit outputs a control signal that comprises a signal to (i) prompt, via a user interface in communication with the control circuit, a user to start a cleaning operation by activating the vacuum cleaner or the air purifier or (ii) to control an activation of the vacuum cleaner or the air purifier to start a cleaning operation of the respective vacuum cleaner or the air purifier in response to the control signal.

2. The method as claimed in claim 1, further comprising:
    cleaning, via a robotic vacuum cleaner, a room if the first amount exceeds the second amount by the predefined threshold.

3. The method as claimed in claim 1, further comprising:
    informing, via the user interface, the user if the first amount exceeds the second amount by the predefined threshold.

4. The method as claimed in claim 1, wherein said second size is smaller than or equal to 5 µm.

5. The method as claimed in claim 4, wherein said second size is smaller than or equal to 2.5 µm.

6. The method as claimed in claim 1, wherein said first size is smaller than or equal to 200 µm.

7. The method as claimed in claim 6, wherein said first size is smaller than or equal to 10 µm.

8. The method of dust processing according to claim 1, wherein the threshold trigger value is selected by a user depending on a predetermined cleanliness or hygiene level.

9. A dust processing system for carrying out the method according to claim 1, the dust processing system comprising:
    a vacuum cleaner or an air purifier;
    a first particle sensor configured to measure a first amount of particles of up to a first size in an indoor area of interest prior to activation of the vacuum cleaner or an air purifier;
    a second particle sensor configured to measure a second amount of particles of up to a second size in an indoor area of interest prior to activation of the vacuum cleaner or an air purifier, wherein the second size is smaller than the first size;
    a control circuit in communication with the first and second particles sensors, wherein the control circuit is configured to determine whether the first amount exceeds the second amount by a predefined threshold in the indoor area of interest; and
    wherein the control circuit is configured such that when the first amount is determined to exceed the second amount by the predefined threshold, the control circuit outputs a control signal that comprises a signal to (i) prompt, via a user interface of the dust processing system, a user to start a cleaning operation by activating the vacuum cleaner or the air purifier or (ii) to control an activation of the vacuum cleaner or the air purifier to start a cleaning operation of the respective vacuum cleaner or the air purifier in response to the control signal.

10. A dust processing system comprising:
    the dust processing system as claimed in claim 9, wherein the control circuit further comprises an output for providing a control signal indicating whether the first amount exceeds the second amount by the predefined threshold; and
    wherein the vacuum cleaner or air purifier comprises an input for receiving the signal for controlling the activation of the vacuum cleaner or the air purifier.

11. The dust processing system as claimed in claim 9, further comprising:
    a user interface for informing the user if the first amount exceeds the second amount by the predefined threshold.

12. The dust processing system as claimed in claim 9, wherein said second size is smaller than or equal to 5 µm.

13. The dust processing system as claimed in claim 9, wherein said first size is smaller than or equal to 200 µm.

14. The dust processing system as claimed in claim 13, wherein said first size is smaller than or equal to 10 µm.

15. The dust processing system as claimed in claim 10, further comprising:
    a user interface for informing the user if the first amount exceeds the second amount by the predefined threshold.

16. The dust processing system as claimed in claim 10, wherein said second size is smaller than or equal to 5 µm.

17. The dust processing system as claimed in claim 10, wherein said first size is smaller than or equal to 200 µm.

18. The dust processing system as claimed in claim 17, wherein said first size is smaller than or equal to 10 µm.

19. The dust processing system as claimed in claim 9, wherein the threshold trigger value is selected by a user depending on a predetermined cleanliness or hygiene level.

20. The dust processing system as claimed in claim 10, wherein the threshold trigger value is selected by a user depending on a predetermined cleanliness or hygiene level.

\* \* \* \* \*